(12) United States Patent
Szapiel (10) Patent No.: US 9,196,020 B2
(45) Date of Patent: Nov. 24, 2015

(54) SYSTEMS AND METHODS FOR DIGITAL CORRECTION OF ABERRATIONS PRODUCED BY TILTED PLANE-PARALLEL PLATES OR OPTICAL WEDGES

(71) Applicant: Raytheon Canada Limited, Ottawa (CA)

(72) Inventor: Stanislaw Szapiel, Port Mcnicoll (CA)

(73) Assignee: RAYTHEON CANADA LIMITED, Ottawa, ON (CA)

( * ) Notice: Subject to any disclaimer, the term of this patent is extended or adjusted under 35 U.S.C. 154(b) by 103 days.

(21) Appl. No.: 14/031,787

(22) Filed: Sep. 19, 2013

(65) Prior Publication Data

US 2015/0077583 A1   Mar. 19, 2015

(51) Int. Cl.
*H04N 5/228* (2006.01)
*G06T 5/00* (2006.01)
*G06T 5/20* (2006.01)
*H04N 5/357* (2011.01)

(52) U.S. Cl.
CPC . *G06T 5/003* (2013.01); *G06T 5/20* (2013.01); *H04N 5/3572* (2013.01)

(58) Field of Classification Search
CPC .................................... H04N 5/23264
USPC ............. 348/208.3, 208.4, 222.1, 255, 279
See application file for complete search history.

(56) References Cited

U.S. PATENT DOCUMENTS

| 4,666,256 A | 5/1987 | Shimizu et al. |
| 2002/0048025 A1* | 4/2002 | Takaoka .................. 356/497 |
| 2008/0166114 A1* | 7/2008 | Engstrom .................. 396/52 |
| 2009/0244300 A1* | 10/2009 | Levin et al. ............... 348/208.5 |

\* cited by examiner

*Primary Examiner* — Usman Khan
(74) *Attorney, Agent, or Firm* — Lando & Anastasi, LLP (57) ABSTRACT

An imaging method and apparatus to provide digital calibration of an optical system that includes one or more removable plane parallel plates or optical wedges. One example of the method includes generating an initial estimate of an optical point spread function of an optical imaging system that includes a plane parallel plate or optical wedge positioned in the optical train based on an optical prescription of the optical imaging system, capturing a first image of a scene using the optical imaging system, and applying a blind deconvolution process to the first image using the initial estimate of the optical point spread function to produce a refined estimate of the optical point spread function and produce a second image that is substantially without blur.

10 Claims, 9 Drawing Sheets

SYSTEMS AND METHODS FOR DIGITAL CORRECTION OF ABERRATIONS PRODUCED BY TILTED PLANE-PARALLEL PLATES OR OPTICAL WEDGES

BACKGROUND

Plane parallel plates and optical wedges are commonly used in a wide variety of optical systems and serve an even wider variety of purposes. Examples of applications utilizing plane parallel plates include protective windows, optical beam splitters, optical beam combiners, anti-aliasing filters, amplitude filters, reflective prisms, reticules, etalons, interferometers, and others. When a plane parallel plate is used in collimated space of an incident light source, the plane parallel plate does not introduce aberration into the light beam upon transmission. However when the light source is not collimated, being either convergent or divergent, aberrations are introduced into the optical beam upon transmission.

If a non-collimated light source is normally incident upon a plane parallel plate, then aberration produced by that plate will be rotationally symmetric. Correction of rotationally symmetric aberration produced by a plane parallel plate is often performed by the inclusion of other rotationally symmetric optical components, such as a lens or series of lenses, into an overall optical system. By appropriate design and placement of additional optical components, additional aberrations introduced into the system act to balance out aberration produced by the plane parallel plate. An example of such a system is a traditional lens-based microscope operating in the presence of a cover glass slide. To correct for aberration introduced by the presence of a cover slide, a microscope objective often has a movable group of lenses included as part of the overall system design. For different axial positions of a movable group of lenses, different amounts of aberrations are generated that can balance out the aberrations introduced by potentially variable, movable, and replaceable cover glass slides. Producing a system with multiple movable components requires potentially complex manufacturing processes, as well as a consistent need for recalibration upon the change or movement of any component in the optical system. The rotationally symmetric components utilized within a microscope mainly correct for spherical aberrations, and hence are mainly useful in systems where the objective is telecentric or nearly telecentric.

When a plane parallel plate is tilted such that a divergent or convergent beam of light is incident at a non-normal angle to its surface, the aberrations produced by that plate upon transmission or reflection are not rotationally symmetric. Consequently, the use of rotationally symmetric lenses or mirrors along a common optical axis cannot be utilized to correct aberrations introduced by a tilted plane parallel plate. Similarly, in the case of an optical wedge where the plate has non-parallel sides (either intentionally or due to fabrication errors), rotational symmetry of the optics is destroyed, even if the plate is not tilted. Accordingly, rotationally symmetric lenses or mirrors along a common optical axis cannot be utilized to correct aberrations causes by optical wedges either.

Figure 1:
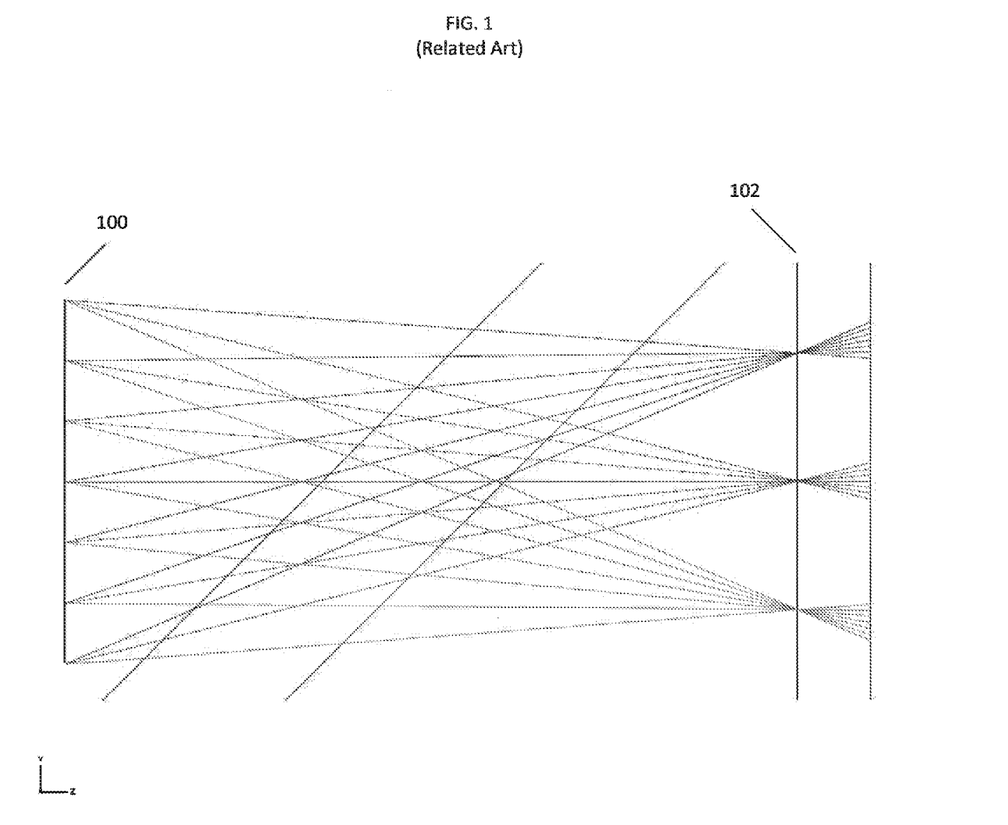
FIG. 1 is a diagram of an imaging process producing no aberration.
Figure 2:
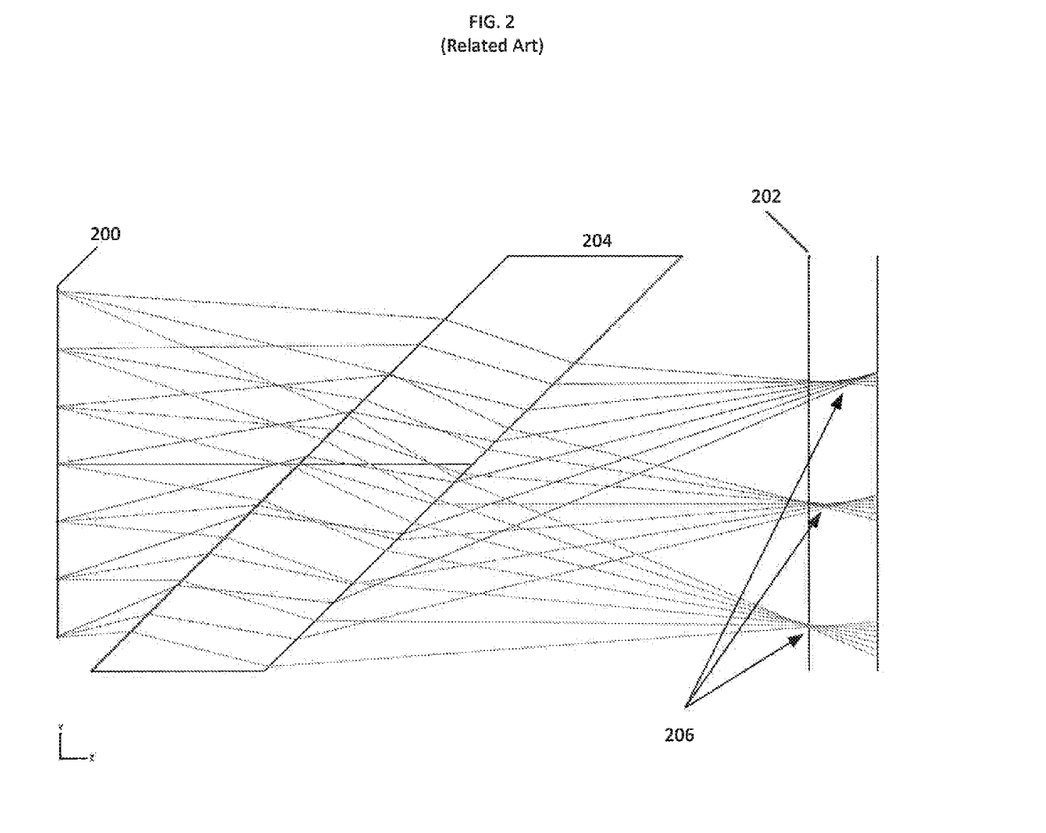
FIG. 2 is a diagram of an imaging process with non-spherically symmetric aberrations introduced by the presence of a plane parallel plate.

The effect of a tilted plane parallel plate in the optical train may be visualized with reference to FIGS. 1 and 2. Referring to FIG. 1, there is illustrated a schematic diagram of a standard imaging process where three pencils of optical rays are depicted as traveling from an object plane 110 through a uniform medium, such as air, to an image plane 120. The three pencils of rays depicted have angular offsets from an optical axis of −10°, 0°, and 10° respectively. In the absence of any disturbances, the rays converge to perfect focal point images on the same image plane 120. In contrast, FIG. 2 is illustrates an example wherein the three pencils of rays propagate from the object plane 110 to the image plane 120 through a tilted plane parallel plate 210 having a refractive index different than the background medium. The tilted plane parallel plate 210 introduces non-rotationally symmetric aberration 220 at each of the image locations on the image plane 120. Due to the aberration present, the pencils of rays produced from an object plane are not able to focus at a single image plane, and the blurred images from a point source have asymmetric blur. As there is no symmetry between lower and upper blur, rotationally symmetric optics sharing a common optical axis with the object plane 110 and image plane 120 cannot be utilized to correct this blur either for the on-axis pencil of rays or off-axis pencils of rays.

Correcting for such non-rotationally symmetric aberrations has traditionally required either the use of optical components that are also not rotationally symmetric or the tilting of added rotationally symmetric optical components in such a manner that all components in the system do not share a common optical axis. The manufacture and calibration of optical imaging systems containing multiple components that do not share a common optical axis has a much greater complexity compared to systems where all components are aligned along a common optical axis. In addition to increased manufacturing and calibration difficulty, the most commercially available lenses are spherically symmetric components, and consequently the prices for specialized non-rotationally symmetric optical components are likely more expensive and are more difficult to obtain. The aberration compensation achieved through an introduction of one or more non-rotationally symmetric optical components will be operational for a specifically located and oriented tilted plane parallel plate having a particular thickness and material refractive index. Should any of these location, orientation or plate parameters change, the previously introduced non-rotationally symmetric optical elements no longer correct the aberrations produced by the plate and a difficult recalibration or expensive redesign of the optical system will likely be required.

SUMMARY OF INVENTION

Embodiments disclosed herein relate generally to optical imaging, and more particularly, to systems and processes for correcting image blur associated with aberration from tilted plane parallel plates and/or optical wedges.

According to one embodiment, an imaging method comprises generating an initial estimate of an optical point spread function of an optical imaging system that includes a plane parallel plate or optical wedge positioned in the optical train based on an optical prescription of the optical imaging system, capturing a first image of a scene using the optical imaging system, and applying a blind deconvolution process to the first image using the initial estimate of the optical point spread function to produce a refined estimate of the optical point spread function, and produce a second image that is substantially without blur.

In one example the imaging method further comprises capturing a third image using the optical imaging system without inclusion of the plane parallel plate in the optical train. Producing the second image may include removing blur in the first image to produce the second image. In one example the imaging method further comprises comparing the second image to the third image to determine an extent of blur removal from the second image. The imaging method may further comprise storing the refined estimate of the optical point spread function on a computer-readable storage medium. In another example the imaging method further comprises capturing a third image of the scene using the optical imaging system, and processing the third image by applying a deconvolution process to the third image using the refined estimate of the optical point spread function.

According to another embodiment, an optical imaging system comprises an imaging detector configured to produce a first image of a scene responsive to electromagnetic radiation received from the scene, an optical sub-system including a plane parallel plate or optical wedge and configured to focus the electromagnetic radiation from the scene onto the imaging detector, and a processor coupled to the imaging detector. The processor may be configured to generate an initial estimate of an optical point spread function of the optical sub-system based on an optical prescription of the optical sub-system, receive the first image from the imaging detector, and apply a blind deconvolution process to the first image using the initial estimate to produce a refined estimate of the optical point spread function, and remove blur from the first image to produce a second image that is substantially without blur.

In one example of the optical imaging system the plane parallel plate or optical wedge is selectively movable into and out of an imaging optical pathway of the optical sub-system. In another example the imaging detector is further configured to produce a third image of the scene with the plane parallel plate or optical wedge moved out of the imaging optical pathway, and wherein the processor is further configured to receive the third image and to compare the second image and the third image for determination of an extent of blur removal from the second image. In another example the plane parallel plate or optical wedge is tilted with respect to an optical axis of the optical sub-system. The processor may be further configured to receive a third image from the imaging detector, and apply a deconvolution process to the third image using the refined estimate of the optical point spread function.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to apparatus and processes for digital imaging systems that provide for the correction of non-rotationally symmetric aberrations due to the presence of at least one tilted plane parallel plate within the optical train of an imaging system. As discussed in more detail below, a blurred digital image captured through an optical imaging system containing at least one tilted plane parallel plate can be deblurred by process executed by a processor that utilizes knowledge of an optical system's current ideal point spread function in combination with a blind deconvolution process that corrects for aberration-induced blur within a digital image. A resulting imaging system point spread function obtained through a blind convolution process can be said to have "virtually calibrated" an optical system containing a tilted plane parallel plate. Through the use of computational modeling and image post-processing, the system eliminates the need for physical redesign and recalibration of an optical system due to blur induced by non-rotationally symmetric aberrations, and provides for an imaging system that is robust to the repositioning, removal, or replacement of an included tilted plane parallel plate, as discussed below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 5:
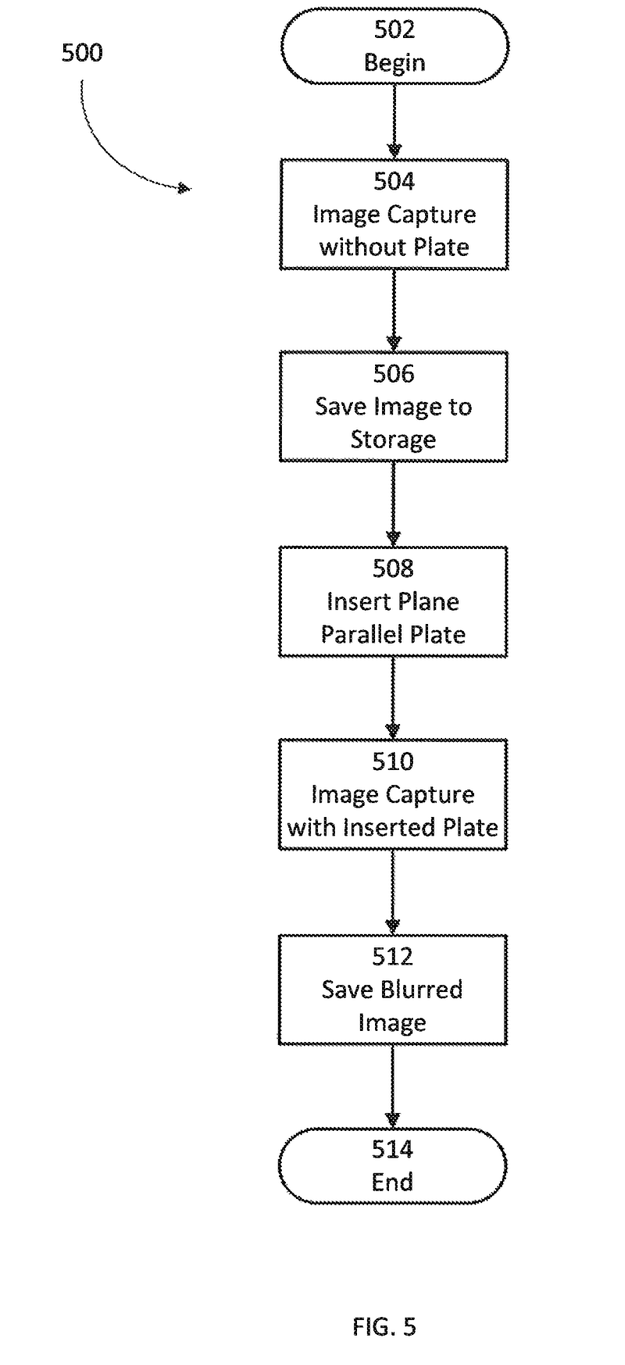
FIG. 5 is a flow diagram of one example of steps taken in capturing and storing digital images, in accord with aspects of the invention.

Some embodiments disclosed herein implement a digital imaging and processing system using one or more refractive or reflective optical elements, one or more digital imaging detector arrays, and one or more processing systems, such as the computer system described below with reference to FIG. 5. According to these embodiments, a digital imaging and processing system captures a digital image through an optical train containing at least one plane parallel plate and digitally corrects blur from non-rotationally symmetric aberration induced by the plane parallel plate to achieve a state of virtual calibration. Once the system has been virtually calibrated, additional images can be captured, often in rapid succession, and automatically deblurred using the results of the virtual calibration process.

Figure 3:
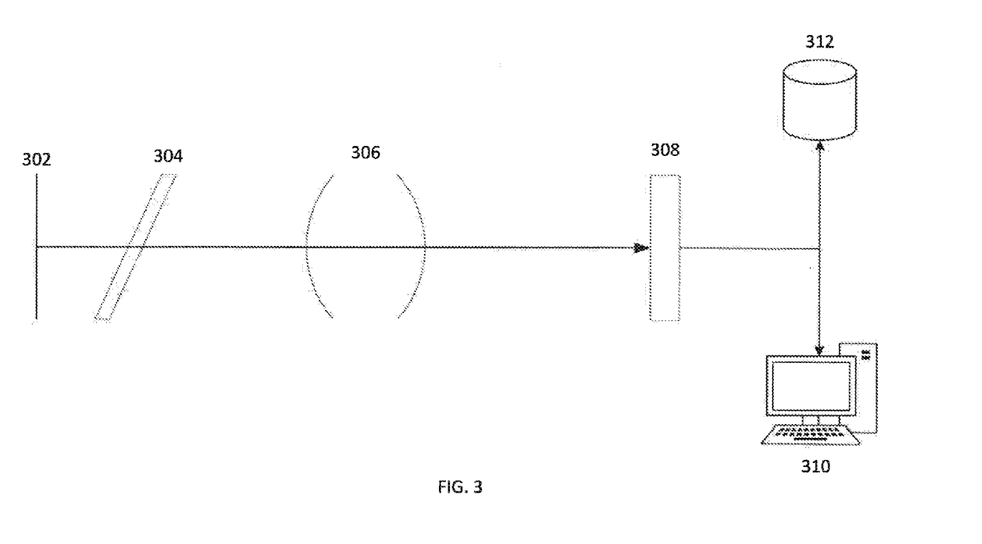
FIG. 3 is a schematic diagram of one example of an imaging and image processing apparatus including a plane parallel plate inserted in the optics train, in accord with aspects of the invention.

Referring to FIG. 3, there is illustrated a schematic diagram of one example of the optical imaging and processing system 300 utilized for correcting non-rotationally symmetric aberrations, in accordance with an embodiment. The optical imaging and processing system 300 is directed toward an object 302 located at an object plane. A tilted plane parallel plate 304 located within the optical train of the system, and imaging optics 306 are used to produce an image on an image detector array 308 located at the image plane. According to one embodiment, once an image is detected by a detector array and converted into digital signals representing that image, those signals can be processed by a computer system 310 and stored to a storage device 312. In some embodiments, a processing system 310 can be used to execute an optical design modeling program, such as ZEMAX® from Radiant Zemax, LLC of Redmond, Wash., CODE-V® from Synopsis, Inc. of Mountain View, Calif., OSLO® from Lambda Research Corporation of Littleton, Mass., or other similar optical design packages. In further embodiments, the processing system 310 can be used to execute an image processing software program capable of performing the techniques of two-dimensional blind deconvolution and standard two-dimensional deconvolution, wherein examples of such image processing software programs include the Image Processing Toolbox™ for MATLAB® from The MathWorks, Inc. of Natick, Mass., the DeconvolutionLab plug-in for ImageJ from Ecole Polytechnique Federale De Lausanne of Lausanne, Switzerland, the Autoquant X3 program from Andor Technology PLC of Belfast, United Kingdom, or similar image processing programs.

A standard two-dimensional optical deconvolution, i.e. an operation inverse to a relevant optical convolution, attempts to recover a sharp image from a blurry image created by an imager provided that the point spread function that caused the blur is known. Blind deconvolution operations are a family of algorithms that aim to recover a sharp image from a blurry image when the mathematical kernel describing the point spread function of the system causing the blur is unknown. In addition to producing a deblurred image, the execution of a blind deconvolution algorithm, such as the algorithms present in the image processing software packages mentioned above, can also produce an approximate point spread function for the system that produced the image blur.

Embodiments of the system perform digital image capture, optical system modeling and digital image processing operations for the correction of non-rotationally symmetric aberration induced image blur. In some embodiments, these image capture, system modeling, and image processing operations are performed by a digital imaging and processing system, such as the optical imaging and computational system 300. The optical transfer function is defined in incoherent imaging as the two-dimensional Fourier transform of the intensity point spread function. The point spread function is, in turn, a distribution of intensity in the image of a point object. According to one embodiment, an initial "kernel" or estimate of the point spread function of the optical imaging system is obtained based on an idealized computer model of the system. In other embodiments, the kernel is produced using the optical transfer function of optical imaging system, also obtained based on an idealized computer model of the system, as discussed further below. This initial kernel may be used as a starting input to a blind deconvolution process which applies an iterative process to refine the kernel and virtually (digitally) calibrate the system, as discussed further below. Once a reasonable kernel has been established and stored, the system can be considered calibrated, and an ordinary deconvolution process may be used, based on the obtained kernel, to quickly produce decoded, blur-free images of a scene captured by the optical imaging system.

Figure 4:
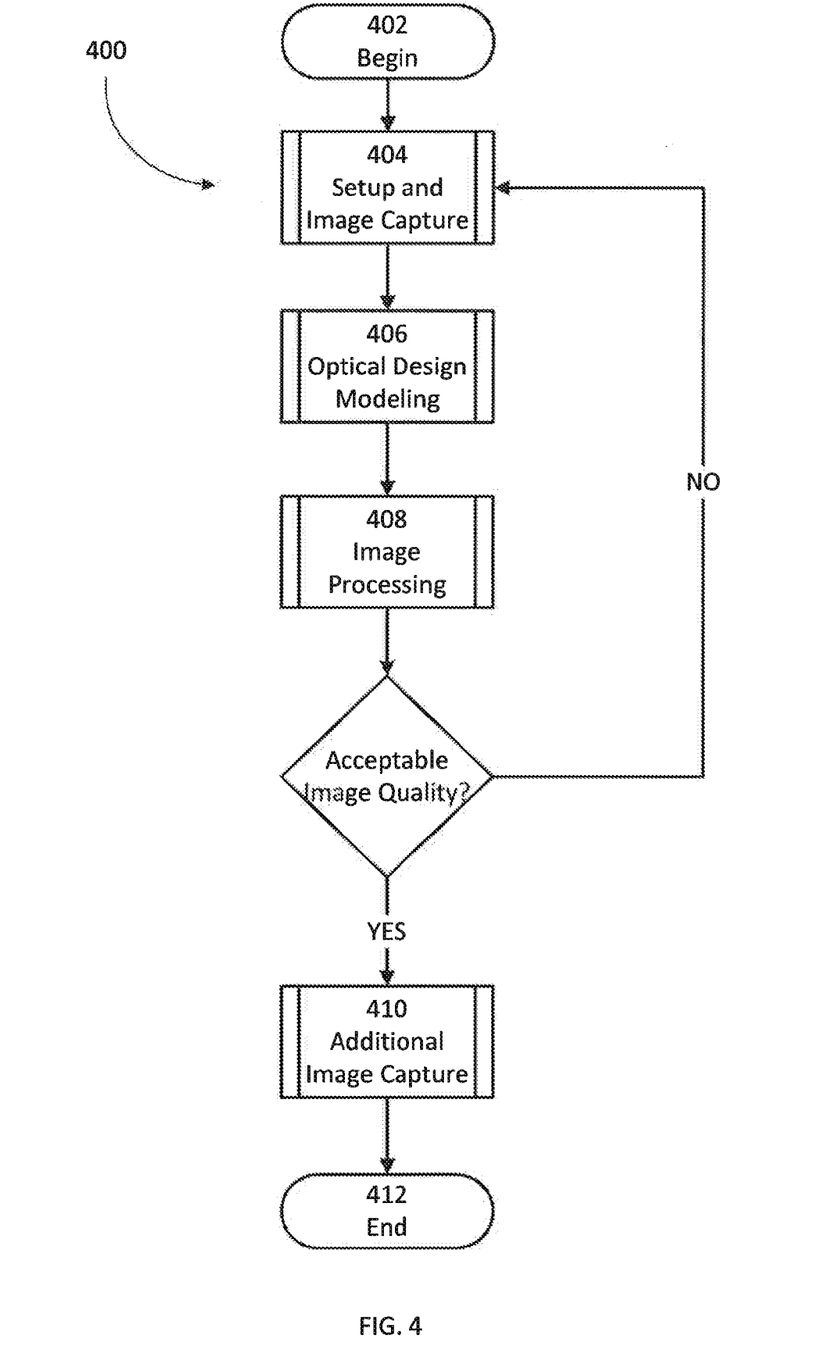
FIG. 4 is a flow diagram illustrating one example of steps taken in a virtual calibration process for deblurring an image resulting from non-spherically symmetric aberrations from a plane parallel plate in accord with aspects of the invention.

One such example of a process incorporating digital image capture, optical system modeling, and digital image processing is illustrated in the flow diagram of FIG. 4. According to this example, the digital aberration correction process 400 includes acts of capturing digital images from an optical system both with and without the presence of a tilted plane parallel plate, modeling the point spread function of the same optical system with inclusion of a tilted plane parallel plate using optical design software, performing image processing functionality for blind deconvolution on digital images containing non-rotationally symmetric aberration induced blur, and performing standard deconvolution operations on subsequent digital images using a point spread function associated with a "virtually calibrated" optical imaging system.

Process 400 begins at 402 and describes an overall workflow for the system. In act 404, the optical components of the imaging and computational system 300 are utilized to capture and store digital images of an object both without the presence of a plane parallel plate in the overall optical train, and with a plane parallel plate inserted into the optical train. The specific actions taken as part of this image capture and storage process are described in more detail below with reference to FIG. 5.

In act 406, optical design modeling software executing on a computer system, such as system 310 of FIG. 3, is used for simulating the physical behavior of the optical train elements in system 300. The specific actions taken as part of this optical modeling process are described in more detail below with reference to FIG. 6.

In act 408, the captured digital images and results of optical system modeling are used as inputs to a blind deconvolution algorithm that produces a deblurred image and returns an updated point spread function which acts as a virtual calibration process. The specific actions taken as part of this image processing-enabled virtual calibration process are described in more detail below with reference to FIG. 7.

After completing a blind deconvolution of the initial optical system setup including the plane parallel plate, a decision is made regarding the quality of the resulting digital image produced by the blind deconvolution process. If the image was determined not of acceptable quality, then the optical system likely needs physical adjustment, and the process returns to step 404. If the deblurred image was determined to be of sufficient quality, then the virtual calibration process is deemed successful and the point spread function obtained from the blind deconvolution operation can be used to deblur other digital images captured with the same configuration of the optical imaging system.

In act 410, additional images are captured by the image detector array 308 and deblurred using a convolution operation performed by the computer system 310. The specific actions taken as part of this image capture and image processing operation are described in more detail below with reference to FIG. 8.

Process 400 ends at 412. The image capture, optical system modeling, and image processing operations in accord with process 400 simplify the operations required to obtain a clear image of an object that is subject to non-rotationally symmetric aberrations due to the presence of a plane parallel plate in the train of optical imaging components utilized for image capture.

As discussed above with regard to act 404 shown in FIG. 4, various examples provide processes for the physical configuration of an optical imaging system and performing digital image capture. FIG. 5 illustrates one such process 500 that includes acts of capturing a digital image in the absence and presence of a plane parallel plate within the imaging system's optical train, aligning the plane parallel plate within the optical train, and saving a captured digital image to a storage location. Process 500 begins at 502.

In act 504, a digital imaging system, such as system 300, is initially in a state without the presence of a plane parallel plate or optical wedge 304 in its optical train. An image of an object 302 is digitally captured by an image detector array 308. An example of this mode of operation might include an image taken by a digital microscope without the presence of an inserted cover glass slide. In act 506, the image captured by the image detector array 308 is saved to a storage location 312 to be stored for later use in the virtual calibration process. In act 508, a plane parallel plate is inserted into the optical train of the digital imaging system introducing non-rotationally symmetric aberrations into the image produced at the image detector array 308. In act 510, the location of the image detector array 308 is adjusted to coincide with an altered image plane location resulting from the presence of the plane parallel plate or optical wedge 304 in the optical train. In some embodiments, the change in location of the optical image plane due to the presence or absence of a plane parallel plate or optical wedge can be determined analytically using known formulas. In other embodiments, the change in location of the optical image plane can be calculated using appropriate optical design software to model the optical imaging system. In act 512, a second image of object 302 is digitally captured by an image detector array 308. The second captured digital image contains asymmetric blur that is to be removed as part of the virtual calibration operation. In act 514, the second captured digital image is saved to storage location 312 to be stored for later use in the virtual calibration process. Process 500 ends at 516.

Figure 6:
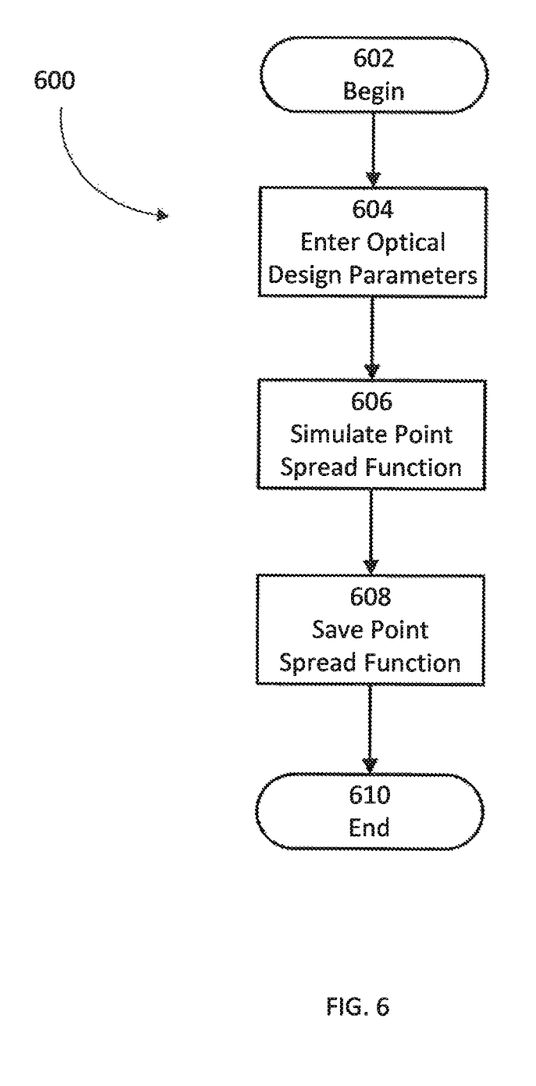
FIG. 6 is a flow diagram of one example of steps taken in simulating an optical system's point spread function, in accord with aspects of the invention.

As discussed above with regard to act 406 shown in FIG. 4, various examples provide processes for modeling the propagation of light through an optical imaging system through use of optical system design software. FIG. 6 illustrates one such process 600 that includes acts of entering optical system design parameters, simulating the point spread function for the optical system, and saving the resulting point spread function. Process 600 begins at 602.

In act 604, the computer system executing an optical design software program receives design parameters representing the components of the optical imaging system in 300 including the plane parallel plate. Parameters normally entered into optical system design software include geometric shape parameters and optical material parameters for each of the components in the optical imaging system. In some embodiments, the optical design software programs utilized might be commercial software specially designed for optical system modeling, such as ZEMAX, CODE-V, OSLO, or other similar commercial optical design programs. In act 606, the entered geometric and optical material parameters for each of the components in the optical imaging setup are used as inputs to functionality for calculating the point spread function of the optical imaging system. This initial point spread function representing the optical imaging system having non-rotationally symmetric aberrations may be used in a later process to provide an initial estimate of a point spread function that would deblur the image produced by a system having the initial point spread function, as discussed further below. In act 608, the initial idealized point spread function of the optical imaging system is saved to a storage location 312. Process 600 ends at 610.

Figure 7:
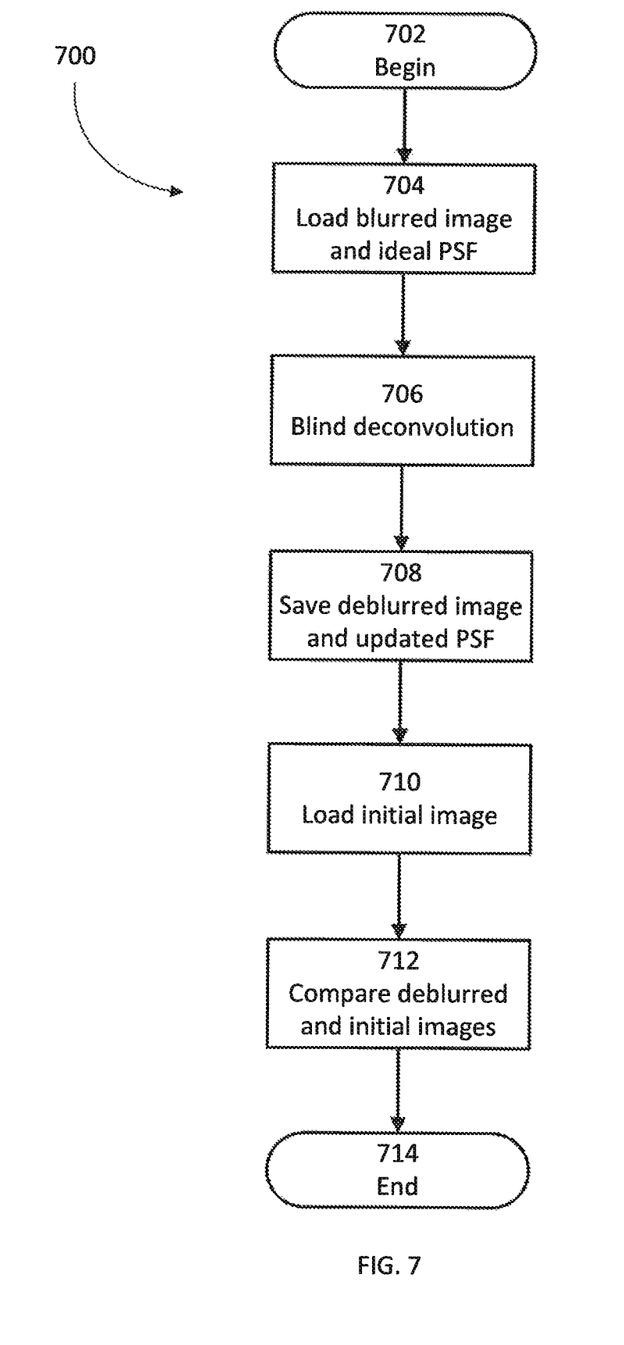
FIG. 7 is a flow diagram of one example of steps taken in deblurring an image and obtaining an updated point spread function via image processing, in accord with aspects of the invention.

As discussed above with regard to act 408 shown in FIG. 4, various examples provide processes for deblurring a digital image by means of a blind deconvolution operation and determining the results of that blind deconvolution operation are suitable as a virtual calibration of the optical imaging system. FIG. 7 illustrates one such process 700 that includes acts of loading appropriate image data and point spread function data, performing a blind deconvolution operation, saving output results, and comparing a deblurred image to a reference non-blurred image. Process 700 begins at 702.

In act 704, the computer system 310 loads from storage location 312 the blurred image taken in step 510 and saved in step 512 as well as the idealized point spread function calculated in step 606 and saved in step 608. In act 706, the blurred image and ideal point spread function are used as inputs to a blind deconvolution operation 706. In some embodiments, the blind deconvolution operation 706 utilized may be from a commercial software package, such as MATLAB's Image Processing Toolbox, the DeconvolutionLab plug-in for ImageJ, or the Autoquant X3 program. The outputs of the blind deconvolution operation include a deblurred version of the input image as well as a calculated point spread function that represents an optical system capable of producing that deblurred image. This updated point spread function represents the virtual calibration of the original optical imaging system in 300. In act 708, the computer system 310 saves the deblurred image and the calibrated point spread function to storage location 312. In act 710, the initial non-blurred image captured in step 504 and saved in step 506 is loaded by the computer system 310 from storage location 312. In act 712, a comparison operation is performed between the deblurred image obtained from the blind deconvolution operation in step 706 and the original non-blurred image. The comparison operation determines whether or not the image produced by the blind deconvolution operation has been sufficiently deblurred, and consequently whether or not the output point spread function from the blind deconvolution is sufficient for a virtual calibration of the optical imaging system in 300. Process 700 ends at 714.

Figure 8:
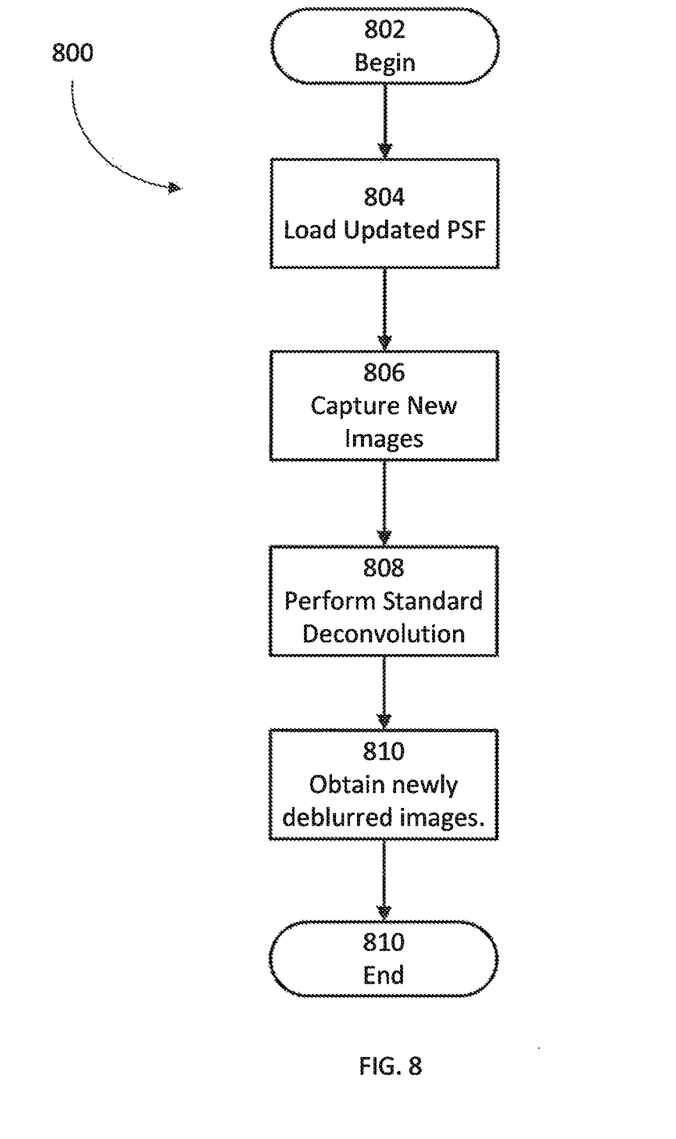
FIG. 8 is a flow diagram of one example of steps taken in capturing additional deblurred images, in accord with aspects of the invention.

As discussed above with regard to act 410 shown in FIG. 4, various examples provide processes for deblurring digital images through a standard deconvolution operation that utilizes as input a previously obtained point spread function associated with a virtual calibration. FIG. 8 illustrates one such process 800 that includes acts of loading a calibrated point spread function, capturing new digital images, performing a standard deconvolution operation, and obtaining newly deblurred images. Process 800 begins at 802.

In act 804, a point spread function associated with an acceptable virtual calibration of the optical imaging system in 300 is loaded by the computer system 310 from storage location 312. In act 806, one or more new digital images are captured by image detector array 308 and either stored within storage location 312 or in the memory of computer system 310. The digital images captured in act 806 contain non-rotationally symmetric blur due to the presence of the plane parallel plate in the optical imaging train of the imaging system. In act 808, the computer system performs standard deconvolution operation from an image processing software package, such as one of the image processing software packages discussed above, on images captured in step 806 using the point spread function loaded in step 804. As a standard deconvolution operation is a very efficient operation, by holding the utilized point spread function in memory of the computer system 310, newly captured images can be deblurred in rapid succession. In act 810, deblurred images are collected as output of the standard deconvolution operation and can be either stored in storage location 312 or maintained in memory by the computer system 310 for additional processing as desired.

The disclosed digital calibration procedure may be useful for implementation in a variety of optical imaging devices. Potential optical imaging devices for which the use of digital calibration via blind deconvolution may be utilized include areas such as digital microscopy, as mentioned above, as well as digital photography. In the area of digital photography, compact system cameras (CSC) and digital single lens reflex (DSLR) cameras are often designed to have interchangeable lenses. Each brand of digital camera may be designed initially to utilize a specific combination of protective windows and stacks of filters, such as mosaic RGB Bayer filters and anti-aliasing filters, in front of the camera sensor in the optical train. When very fast lenses are moved from one type or brand of camera to another, the varying thicknesses and materials utilized in different filters may result in unexpected blur and degraded image resolution. This type of image degradation may be very pronounced when a fast lens designed for a film camera is used on a digital camera body. This effect may be very evident when a camera incorporates separate imaging sensors for separate color channels, such as an RGB sensor system. In such a case, there may be tilted dichroic filters for each color in the camera system. Aspects and embodiments of the systems and methods discussed herein may be used to compensate for such image degradation in digital camera systems, making it easier to switch between different lens systems and filters.

Thus, aspects and embodiments provide a digital calibration procedure to remove aberrations caused by tilted plane parallel plates or optical wedges in the optical train. According to certain embodiments, the digital calibration procedure uses a blind deconvolution process in which the initial kernel estimate for the blind deconvolutor is based on optical prescription data for the optical system. This approach is faster, simpler, and more flexible than conventional methods for removing aberrations which involve hardware modifications and experimental calibrations using typical targets, such as pinholes or slits, to measure the optical point spread functions directly.

Various aspects and functions described herein may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Figure 9:
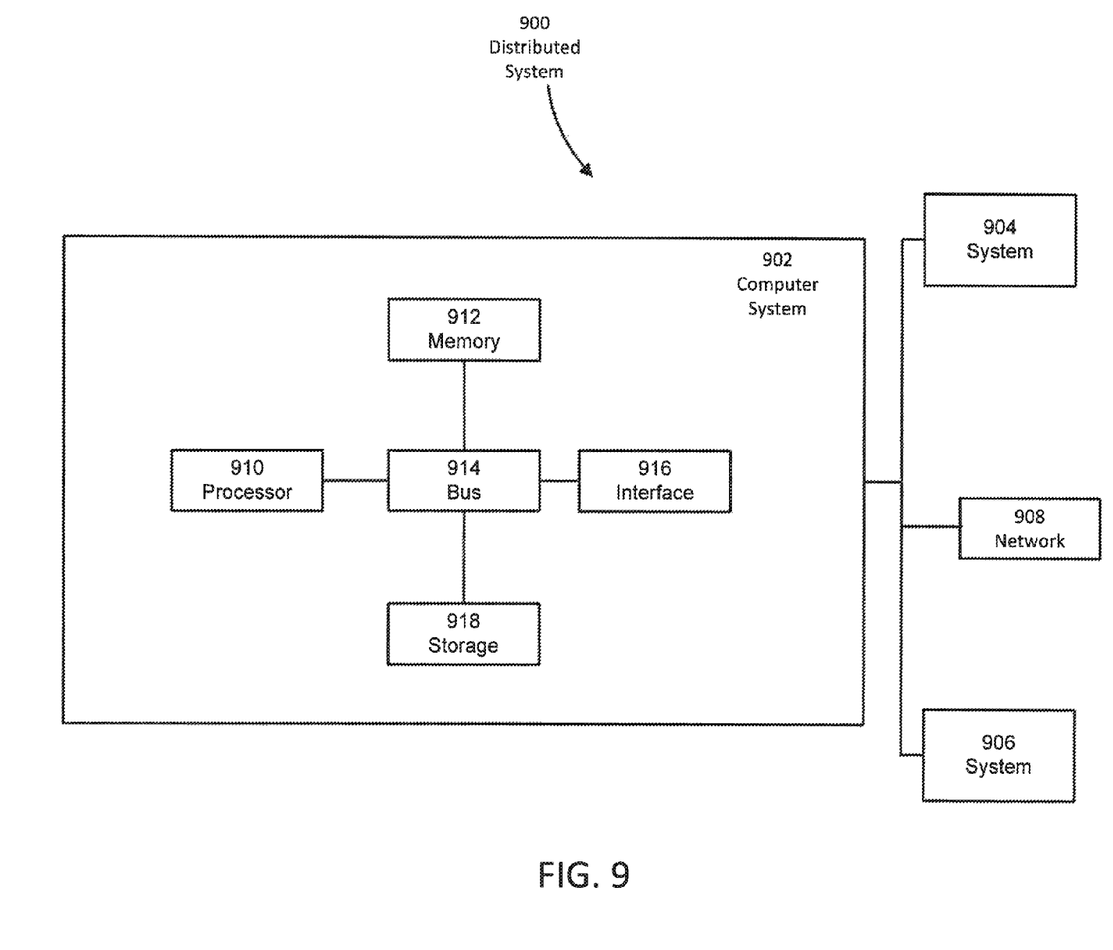
FIG. 9 is a schematic diagram of one example of a computer system.

Referring to FIG. 9, there is illustrated a block diagram of a distributed computer system 900, in which various aspects and functions may be practiced. The distributed computer system 900 may include one more computer systems that exchange, i.e. send or receive, information. For example, as illustrated, the distributed computer system 900 includes computer systems 902, 904 and 906. As shown, the computer systems 902, 904 and 906 are interconnected by, and may exchange data through, communication a network 908. The network 908 may include any communication network through which computer systems may exchange data. To exchange data using the network 908, the computer systems 902, 904 and 906 and the network 908 may use various methods, protocols and standards, including, among others, Token Ring, Ethernet, Wireless Ethernet, Bluetooth, TCP/IP, UDP, DTN, HTTP, FTP, SNMP, SMS, MMS, SS7, JSON, SOAP, CORBA, REST and Web Services. To ensure data transfer is secure, the computer systems 902, 904 and 906 may transmit data via the network 908 using a variety of security measures including, for example, TSL, SSL or VPN. While the distributed computer system 900 illustrates three networked computer systems, the distributed computer system 900 is not so limited and may include any number of computer systems and computing devices, networked using any medium and communication protocol.

Various aspects and functions may be implemented as specialized hardware or software executing in one or more computer systems including the computer system 902 shown in FIG. 9. As depicted, the computer system 902 includes a processor 910, a memory 912, a bus 914, an interface 916 and a storage device 918. The processor 910 may perform a series of instructions that result in manipulated data. The processor 910 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 910 is connected to other system elements, including one or more memory devices 912, by the bus 914.

The memory 912 may be used for storing programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device. Various examples may organize the memory 912 into particularized and, in some cases, unique structures to perform the functions disclosed herein.

Components of the computer system 902 may be coupled by an interconnection element such as the bus 914. The bus 914 may include one or more physical busses, for example, busses between components that are integrated within a same machine, but may include any communication coupling between system elements including specialized or standard computing bus technologies such as IDE, SCSI, PCI and InfiniBand. Thus, the bus 914 enables communications, for example, data and instructions, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 102 to exchange information and communicate with external entities, such as users and other systems.

The storage system 918 may include a computer readable and writeable nonvolatile data storage medium in which instructions are stored that define a program that may be executed by the processor 910. The storage system 918 also may include information that is recorded, on or in, the medium, and this information may be processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the storage system 918. The memory may be located in the storage system 918 or in the memory 912, however, the processor 910 may manipulate the data within the memory 912, and then copy the data to the medium associated with the storage system 918 after processing is completed. A variety of components may manage data movement between the medium and integrated circuit memory element and examples is not limited thereto. Further, examples are not limited to a particular memory system or storage system.

Although the computer system 902 is shown by way of example as one type of computer system upon which various aspects and functions may be practiced, aspects are not limited to being implemented on the computer system 902 as shown in FIG. 9. Various aspects and functions may be practiced on one or more computers having a different architectures or components than that shown in FIG. 9. For instance, the computer system 902 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. Usually, a processor or controller, such as the processor 910, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 910 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used.

The examples disclosed herein may perform a wide variety of functions and may be implemented using various tools. For instance, aspects of an exemplary system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as Web Sphere middleware from IBM of Armonk, N.Y. A computer system running, for example, SQL Server may be able to support both aspects in accord with specific examples disclosed herein and databases for sundry other applications not discussed in the present disclosure. Thus, functional components disclosed herein may include a wide variety of elements, such as executable code, data structures or objects, configured to perform their described functions.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging method for an optical imaging system having an optical train, the method comprising:
generating, based on an optical prescription of the optical imaging system, an initial estimate of an optical point spread function of the optical imaging system, the optical imaging system including a plane parallel plate positioned in the optical train, and the optical prescription defining a structure and arrangement of the optical train;
capturing a first image of a scene using the optical imaging system; and
applying a blind deconvolution process to the first image using the initial estimate of the optical point spread function to:
produce a refined estimate of the optical point spread function; and
remove blur from the first image to produce a second image having reduced blur relative to the first image;
wherein the blind deconvolution process includes a process for removing the blur where a mathematical kernel describing the optical point spread function of the optical imaging system causing the blur is unknown.

2. The imaging method of claim 1, further comprising capturing a third image using the optical imaging system without inclusion of the plane parallel plate in the optical train.

3. The imaging method of claim 2, further comprising comparing the second image to the third image to determine an extent of blur removal from the second image.

4. The imaging method of claim 1, further comprising storing the refined estimate of the optical point spread function on a computer-readable storage medium.

5. The imaging method of claim 4, further comprising:
capturing a third image of the scene using the optical imaging system; and
processing the third image by applying a deconvolution process to the third image using the refined estimate of the optical point spread function.

6. An optical imaging system comprising:
an imaging detector configured to produce a first image of a scene responsive to electromagnetic radiation received from the scene;
an optical sub-system including a plane parallel plate and configured to focus the electromagnetic radiation from the scene onto the imaging detector; and
a processor coupled to the imaging detector and configured to:
generate an initial estimate of an optical point spread function of the optical sub-system based on an optical prescription of the optical sub-system, the optical prescription defining a structure and arrangement of the optical sub-system;
receive the first image from the imaging detector; and
apply a blind deconvolution process to the first image using the initial estimate to:
produce a refined estimate of the optical point spread function; and
remove blur from the first image to produce a second image having reduced blur relative to the first image;
wherein the blind deconvolution process includes a process for removing the blur where a mathematical kernel describing the optical point spread function of the optical sub-system causing the blur is unknown.

7. The optical imaging system of claim 6, wherein the plane parallel plate is selectively movable into and out of an imaging optical pathway of the optical sub-system.

8. The optical imaging system of claim 7, wherein the imaging detector is further configured to produce a third image of the scene with the plane parallel plate moved out of the imaging optical pathway, and wherein the processor is further configured to receive the third image and to compare the second image and the third image for determination of an extent of blur removal from the second image.

9. The optical imaging system of claim 6, wherein the plane parallel plate is tilted with respect to an optical axis of the optical sub-system.

10. The optical imaging system of claim 6, wherein the processor is further configured to:
receive a third image from the imaging detector; and
apply a deconvolution process to the third image using the refined estimate of the optical point spread function.

* * * * *